United States Patent [19]

Muro

[11] Patent Number: 4,900,913
[45] Date of Patent: Feb. 13, 1990

[54] OPTICAL POSITION DETECTOR HAVING FIRST AND SECOND SPACED APART SENSORS FOR DETECTING MULTIPLE LIGHT LEVELS

[75] Inventor: Hideo Muro, Kanagawa, Japan

[73] Assignee: Nissan Motor Company, Limited, Japan

[21] Appl. No.: 269,753

[22] Filed: Nov. 8, 1988

[30] Foreign Application Priority Data

Nov. 9, 1987 [JP] Japan ............................ 62-171059[U]

[51] Int. Cl.⁴ ............................................ H01J 40/14
[52] U.S. Cl. .................................... 250/209; 250/561
[58] Field of Search ................... 250/208, 209, 214 A, 250/214 R, 561; 357/30 H; 324/403; 361/129, 131; 315/151

[56] References Cited

U.S. PATENT DOCUMENTS 4,550,273 10/1985 Boettcher ............................ 315/151

Primary Examiner—Davis I. Willis
Assistant Examiner—William L. Oen
Attorney, Agent, or Firm—Lowe, Price, LeBlanc, Becker & Shur

[57] ABSTRACT

An optical position sensor employs two pairs of light emitting elements and photo sensing elements. Each pair of the light emitting element and the photo sensing element are arranged in a spaced apart relationship with the other pair in a direction of movement of the moving object. The distance between the pairs of the light emitting elements and the photo sensing elements substantially corresponds to the length of the moving object.

9 Claims, 1 Drawing Sheet

OPTICAL POSITION DETECTOR HAVING FIRST AND SECOND SPACED APART SENSORS FOR DETECTING MULTIPLE LIGHT LEVELS

BACKGROUND OF THE INVENTION

1. Field of the Invention

The present invention relates generally to an optical position sensor for detecting a position of a moving object. More specifically, the invention relates to an optical position sensor which can avoid influence of variation of luminance level of a light beam. Further particularly, the invention relates to an optical position sensor which is suitable to use for monitoring angular position of an automotive steering, a crankshaft and so forth.

2. Description of the Background Art

Conventionally, optical position sensors have been used in various fields. Typically, the optical position sensor comprises a light emitting element such as LED and a photo sensing element, such as a phototransistor. The light emitting element and the photo sensing elements are coupled to form a photo-interrupter with a gap defined therebetween, through which a moving object moves. In the automotive technologies, such optical position sensors have been employed as a crank angle sensor, a steering angle sensor, a wheel speed sensor and so forth. However, such conventional optical position sensor is not satisfactorily precise in detecting the moving object. Namely, accuracy of detection of the position of the moving object is affected by fluctuation of luminance level of the light emitting element, offset of the trace of the moving object relative to the sensor and other various factors. Such noise factors tends to cause variation of luminance level distribution to cause shifting of transition point between HIGH level and LOW level of the sensor output.

In case of the optical position sensor employed in the automotive vehicle for monitoring the steering angle sensor, crank angle sensor or wheel speed sensor, it is essential to detect a light interruptor formed on a rotary body for accurately measuring steering angular displacement from a neutral position, crankshaft rotation speed or a road wheel rotation speed. Particularly, in order to facilitate precise control for the vehicular component, such as engine, brake system, suspension system and so forth, high precision level in monitoring the steering angular position, crankshaft angular position and rotation speed of road wheel becomes essential.

SUMMARY OF THE INVENTION

Therefore, it is an object of the present invention to provide an optical position sensor which can solve the problems set forth above and successfully avoid influence of the noise factors to provide accurate result of measuring.

Another object of the present invention is to provide an optical position sensor which is compact enough to be facilitated in a narrow space.

In order to accomplish the aforementioned and other objects, an optical position sensor, according to the present invention, employs two pairs of light emitting elements and photo sensing elements. Each pair of the light emitting element and the photo sensing element are arranged in a spaced apart relationship with the other pair in a direction of movement of the moving object. The distance between the pairs of the light emitting elements and the photo sensing elements substantially corresponds to the length of the moving object.

With the construction set forth above, the position of the moving object can be precisely detected by comparing the outputs of the photo sensing elements.

Furthermore, compact construction of the sensor can be achieved by fabricating an integrated chip in which a photo sensing element and circuit elements of a detector circuits are formed.

According to one aspect of the invention, a sensor unit for detecting a moving object which moves along a predetermined path and has a known length in a direction of movement, at a predetermined reference position, comprising:

a first sensor device which is arranged in the vicinity of the path off a moving object and designed to produce an first output signal variable of signal level between a given first level and a given second level, the first sensor device outputting the first output signal with the first level when the object is output of a first detecting range which is defined in the path of the object at a orientation corresponding to the position of the first sensor device, the first detecting range extends in a direction of movement of the object in a width corresponding to the width of the first sensor, and the first sensor outputting the second level of the first sensor signal when all of the first detecting range is occupied by the object;

a second sensor device which is arranged in the vicinity of the path of a moving object, is oriented at a position equal distance from the reference position to the distance between the first sensor device and the reference position and opposite side of the first sensor device, a distance between the first and second sensor devices being slightly shorter than the known length of the object, and designed to produce an second output signal variable of signal level between a given first level and a given second level, and the second sensor device outputting the second output signal with the first level when the object is output of a second detecting range which is defined in the path of the object at a orientation corresponding to the position of the second sensor device, the second detecting range extends in a direction of movement of the object in a width corresponding to the width of the second sensor, and the second sensor outputting the second level of the second sensor signal when all of the second detecting range is occupied by the object; and a circuit means for receiving the first and second output signals to detect the object at the reference position by detecting the first and second output signals both having third signal level between the first and second signal levels.

According to another aspect of the invention, an optical sensor unit for detecting a moving object which moves along a predetermined path and has a known length in a direction of movement, at a predetermined reference position, comprising:

a first optical sensor device which is arranged in the vicinity of the path off a moving object and designed to produce an first output signal variable of signal level between a given first level and a given second level depending upon magnitude of light received, the first optical sensor device outputting the first output signal with the first level when the object is output of a first detecting range which is defined in the path of the object at a orientation corresponding to the position of the first optical sensor device, the first detecting range extends in a direction of movement of the object in a width corresponding to the width of the first sensor, and the first sensor outputting the second level of the first sensor signal when all of the first detecting range is occupied by the object;

a second optical sensor device which is arranged in the vicinity of the path of a moving object, is oriented at a position equal distance from the reference position to the distance between the first optical sensor device and the reference position and opposite side of the first optical sensor device, a distance between the first and second optical sensor devices being slightly shorter than the known length of the object, and designed to produce an second output signal variable of signal level between a given first level and a given second level depending upon magnitude of received light, and the second optical sensor device outputting the second output signal with the first level when the object is output of a second detecting range which is defined in the path of the object at a orientation corresponding to the position of the second optical sensor device, the second detecting range extends in a direction of movement of the object in a width corresponding to the width of the second sensor, and the second sensor outputting the second level of the second sensor signal when all of the second detecting range is occupied by the object; and a circuit means for receiving the first and second output signals to detect the object at the reference position by detecting the first and second output signals both having third signal level between the first and second signal levels.

The optical sensor comprises a light emitting element and a photo sensing element arranged in alignment to each other in a direction substantially perpendicular to the path of movement of the object. The photo sensing elements in the first and second optical sensor devices and the circuit means for formed into a single chip. Preferably, the chip is a semiconductor chip.

DESCRIPTION OF THE PREFERRED EMBODIMENT

Figure 1:
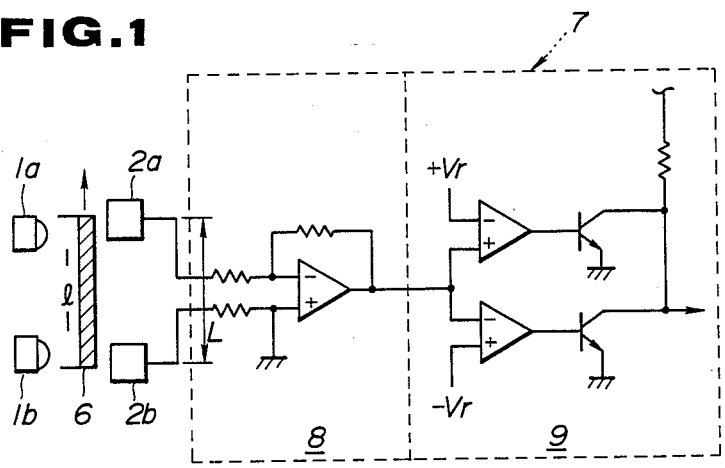
FIG. 1 is a circuit diagram of the preferred embodiment of an optical position sensor according to the present invention.
Figure 2:
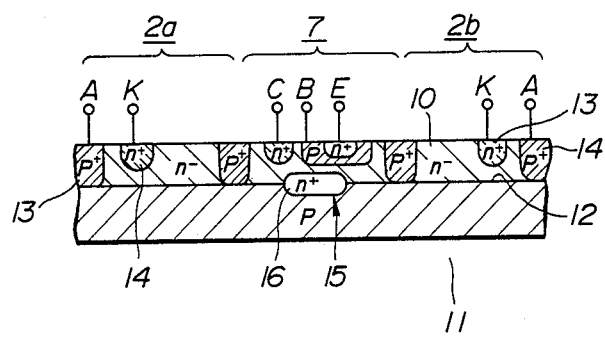
FIG. 2 is a sectional view of a semiconductor device including a photo sensing element in the optical position sensor of FIG. 1, and a detector circuit.

Referring now to the drawings, particularly to FIG. 1, the preferred embodiment of an optical position sensor, according to the present invention, includes a first pair of a light emitting element 1a, such as LED, and a photo sensing element 2a which is variable of output signal level depending upon the magnitude of photo irradiated thereof. The optical position sensor also has a second pair of a light emitting element 1b and a photo sensing element 2b. Each pair of the light emitting element 1a or 1b and the photo sensing element 2a or 2b are arranged in spaced apart relationship to each other to define therebetween a path for a moving object 6. The paths for the moving object 6 defined in first and second pairs of the light emitting elements and the photo sensing elements are aligned to each other so that the moving object 6 can pass therethrough.

The moving object 6 can be a notch formed on a rotary body, such as a rotary disc. In such case, the notch extends radially from the rotary body so that it may pass the paths periodically. By detecting frequency of occurrence that the notch passes through the paths, rotation speed of the rotary body can be measured. On the other hand, by detecting notch in the path, a reference position of the rotary body can be detected. Though the shown embodiment is illustrated to have only one moving objects, it is, of course, possible to detect a plurality of objects. For example, in case of steering angle sensor, a rotary disc may be fixed to a steering shaft for rotation therewith. A plurality of notches are radially projected from the circumference of the rotary disc. The notches are arranged with a given constant interval which corresponds to a given steering angle.

The first and second pairs of the light emitting elements 1a and 1b and the photo sensing elements 2a and 2b are arranged in spaced apart relationship in a direction toward which the moving object 6 moves. The center-to-center distance L between the first and second pairs substantially corresponds to the length l of the moving object 6.

Figure 3:
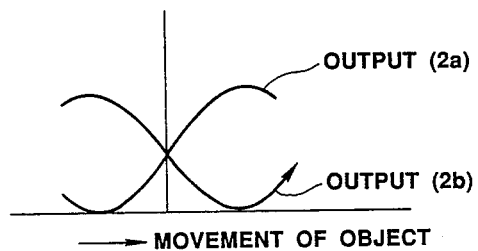
FIG. 3 is a chart showing waveforms of outputs of two photo sensing elements employed in the preferred embodiment of the optical position sensor of FIG. 1.

The photo sensing elements 2a and 2b are connected to a detector circuit 7. The detector circuit 7 comprises a subtractor circuit 8 and a window comparator 9. With the shown circuit construction, HIGH level detector signal is output from the detector circuit 7 at an intersection point of the outputs of the photo sensing elements, as shown in FIG. 3. Namely, assuming the moving object 6 moves in a direction as shown by arrow in FIG. 1, the moving object 6 at first passes across the path defined by the light emitting element 1b and the photo sensing element 2b. Therefore, the output lever of the photo sensing element 2b is once lowered by blocking of light from the light emitting element 1b by the moving object, as shown in FIG. 3. Thereafter, the moving object 6 passes across the path defined between the light emitting element 1a and the photo sensing element 2a. Therefore, the output level of the photo sensing element 2a gradually reduced according to reducing of amount of light received from the light emitting element 1a and becomes minimum level while the moving object 6 completely blocks the light from the light emitting element 1a. When the longitudinal center of the moving object is oriented at the center between the first and second pairs of the light emitting elements 1a and 1b and the photo sensing elements 2a and 2b, the magnitude of blocking the light from the light emitting elements 1a and 1b by the front and rear end portions of the moving object becomes substantially equal. Therefore, at this time, the output level of the photo sensing elements 2a and 2b become equal to each other. Therefore, by detecting the point where the output levels of the photo sensing elements 2a and 2b become equal to each other, the position of the moving object 6 at the center between the first and second pairs can be detected. Therefore, as set forth above, at this point, the HIGH level detector signal is output.

FIG. 3 shows section of a semiconductor device in which photo sensing elements 2a and 2b and the detector circuit 7 are formed on a single chip. In the shown construction of the semiconductor device, a n-type epitaxial layer 10 is formed on a p-type semiconductor substrate 11 by way of epitaxial growing process. Between the substrate 11 and the epitaxial layer 10, p—n interface 12 is formed.

As a photo sensing elements 2a and 2b, photodiodes are formed by p+ region 13 and n+ region 14 by doping n-type and p-type impurity. The outputs of the photodiodes 2a and 2b are transferred to the detector circuit 7 which is illustrated in FIG. 3 in a form of NPN transistor 15 for the purpose of illustration. The shown NPN transistor has n+ source region 16 receiving the output of the photodiodes 2a and 2b via p—n interface 12.

These components of the semiconductor device can be fabricated by way of bi-pola process. This construction saves substantial space. Therefore, the optical sensor assembly having two pair of light emitting elements and photo sensing elements can be formed with compact construction so as to allow installation even in substantially small space.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A sensor unit for detecting a moving object which moves along a predetermined path and has a known length in a direction of movement, at a predetermined reference position, comprising:

a first sensor device which is arranged in the vicinity of said path off a moving object and designed to produce a first output signal variable of signal level between a given first level and a given second level, said first sensor device outputting said first output signal with said first level when said object is output of a first detecting range which is defined in the path of said object at a orientation corresponding to the position of said first sensor device, said first detecting range extends in a direction of movement of said object in a width corresponding to the width of said first sensor, and said first sensor outputting said second level of said first sensor signal when all of said first detecting range is occupied by said object;

a second sensor device which is arranged in the vicinity of said path of a moving object, is oriented at a position equal distance from said reference position to the distance between said first sensor device and said reference position and opposite side of said first sensor device, a distance between said first and second sensor devices being slightly shorter than said known length of said object, and designed to produce an second output signal variable of signal level between a given first level and a given second level, and said second sensor device outputting said second output signal with said first level when said object is output of a second detecting range which is defined in the path of said object at a orientation corresponding to the position of said second sensor device, said second detecting range extends in a direction of movement of said object in a width corresponding to the width of said second sensor, and said second sensor outputting said second level of said second sensor signal when all of said second detecting range is occupied by said object; and a circuit means for receiving said first and second output signals to detect said object at said reference position by detecting said first and second output signals both having third signal level between said first and second signal levels.

2. A sensor unit as set forth in claim 1, wherein each of said first and second sensor device comprises an optical sensor.

3. A sensor unit as set forth in claim 2, wherein said optical sensor comprises a light emitting element and a photo sensing element arranged in alignment to each other in a direction substantially perpendicular to said path of movement of said object.

4. A sensor unit as set forth in claim 3, wherein said photo sensing elements in said first and second sensor devices and said circuit means for formed into a single chip.

5. A sensor unit as set forth in claim 4, wherein said photo sensing elements in said first and second sensor devices and said circuit means for formed into a single chip semiconductor device.

6. An optical sensor unit for detecting a moving object which moves along a predetermined path and has a known length in a direction of movement, at a predetermined reference position, comprising:

a first optical sensor device which is arranged in the vicinity of said path off a moving object and designed to produce an first output signal variable of signal level between a given first level and a given second level depending upon magnitude of received light, said first optical sensor device outputting said first output signal with said first level when said object is output of a first detecting range which is defined in the path of said object at a orientation corresponding to the position of said first optical sensor device, said first detecting range extends in a direction of movement of said object in a width corresponding to the width of said first sensor, and said first sensor outputting said second level of said first sensor signal when all of said first detecting range is occupied by said object;

a second optical sensor device which is arranged in the vicinity of said path of a moving object, is oriented at a position equal distance from said reference position to the distance between said first optical sensor device and said reference position and opposite side of said first optical sensor device, a distance between said first and second optical sensor devices being slightly shorter than said known length of said object, and designed to produce an second output signal variable of signal level between a given first level and a given second level depending upon magnitude of received light, and said second optical sensor device outputting said second output signal with said first level when said object is output of a second detecting range which is defined in the path of said object at a orientation corresponding to the position of said second optical sensor device, said second detecting range extends in a direction of movement of said object in a width corresponding to the width of said second sensor, and said second sensor outputting said second level of said second sensor signal when all of said second detecting range is occupied by said object; and a circuit means for receiving said first and second output signals to detect said object at said reference position by detecting said first and second output signals both having third signal level between said first and second signal levels.

7. A sensor unit as set forth in claim 6, wherein said optical sensor comprises a light emitting element and a photo sensing element arranged in alignment to each other in a direction substantially perpendicular to said path of movement of said object.

8. A sensor unit as set forth in claim 7, wherein said photo sensing elements in said first and second optical sensor devices and said circuit means for formed into a single chip.

9. A sensor unit as set forth in claim 8, wherein said photo sensing elements in said first and second optical sensor devices and said circuit means for formed into a single chip semiconductor device.

* * * * *